(12) United States Patent
Wei et al.

(10) Patent No.: US 10,798,399 B1
(45) Date of Patent: Oct. 6, 2020

(54) ADAPTIVE VIDEO COMPRESSION

(71) Applicant: Amazon Technologies, Inc., Reno, NV (US)

(72) Inventors: Hai Wei, Seattle, WA (US); Charles Benjamin Franklin Waggoner, Portland, WA (US); Yang Yang, Issaquah, WA (US); Srinivas Rajagopalan, Seattle, WA (US); Deepthi Nandakumar, Bangalore (IN); Lei Li, Kirkland, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/837,884

(22) Filed: Dec. 11, 2017

(51) Int. Cl.
| | |
|---|---|
| *H04N 19/46* | (2014.01) |
| *H04N 19/182* | (2014.01) |
| *H04N 19/172* | (2014.01) |
| *H04N 19/132* | (2014.01) |

(52) U.S. Cl.
CPC ........... *H04N 19/46* (2014.11); *H04N 19/132* (2014.11); *H04N 19/172* (2014.11); *H04N 19/182* (2014.11)

(58) Field of Classification Search
CPC .... H04N 19/46; H04N 19/132; H04N 19/182; H04N 19/172
See application file for complete search history.

(56) References Cited

U.S. PATENT DOCUMENTS

| | | | | |
|---|---|---|---|---|
| 8,190,647 | B1* | 5/2012 | Pereira | G06F 21/566 707/749 |
| 8,897,370 | B1* | 11/2014 | Wang | H04N 19/139 375/240.2 |
| 10,223,438 | B1* | 3/2019 | Xu | H04N 21/26258 |
| 2003/0099395 | A1* | 5/2003 | Wang | G06K 9/00248 382/165 |
| 2006/0062292 | A1* | 3/2006 | Boice | H04N 19/172 375/240.01 |
| 2007/0081586 | A1* | 4/2007 | Raveendran | H04N 19/137 375/240.1 |
| 2007/0214135 | A1* | 9/2007 | Crivat | G06F 16/2465 |
| 2013/0167181 | A1* | 6/2013 | Dixit | H04N 21/64784 725/95 |
| 2014/0379484 | A1* | 12/2014 | Duponchel | G06Q 30/0269 705/14.66 |
| 2015/0066929 | A1* | 3/2015 | Satzke | H04L 67/10 707/737 |

(Continued)

*Primary Examiner* — Joseph Suh
(74) *Attorney, Agent, or Firm* — Hogan Lovells US LLP

(57) ABSTRACT

An adaptive video compression system may receive video data to be compressed, such as for delivery to a user device by a video streaming service. For example the video data may be an entire video file or a segment of a video file. The adaptive video compression system determines a suitable encoding scheme for compressing the video data. In order to determine the encoding scheme, the video data may be analyzed to extract a plurality of features interests of the video data, which may represent one or more characteristics of the video data. The features may be concatenated and collectively expressed as a feature vector. The feature vector is then used to determine a classification for the video data. Accordingly, an encoding scheme is determined for the video data based on the classification of the video data, and applied to video data to compress the video data.

20 Claims, 10 Drawing Sheets

(56) References Cited

U.S. PATENT DOCUMENTS

| | | | | |
|---|---|---|---|---|
| 2015/0277686 A1* | 10/2015 | LaForge | .................. | H04L 67/10 |
| | | | | 715/723 |
| 2015/0296208 A1* | 10/2015 | Gao | .................... | H04N 19/124 |
| | | | | 375/240.03 |
| 2016/0132771 A1* | 5/2016 | Shetty | ................ | G06Q 30/0631 |
| | | | | 706/46 |
| 2016/0140425 A1* | 5/2016 | Kulkarni | .............. | G06K 9/4628 |
| | | | | 382/159 |
| 2017/0078687 A1* | 3/2017 | Coward | .............. | H04N 19/395 |
| 2017/0310969 A1* | 10/2017 | Chen | .................... | H04N 19/136 |
| 2018/0268458 A1* | 9/2018 | Popa | ....................... | G06Q 30/02 |
| 2018/0376153 A1* | 12/2018 | Gokhale | ............. | H04N 19/132 |
| 2019/0130215 A1* | 5/2019 | Kaestle | ............. | G06K 9/00771 |
| 2019/0171906 A1* | 6/2019 | Sodhani | ............... | G06K 9/6228 |

\* cited by examiner

ADAPTIVE VIDEO COMPRESSION

BACKGROUND

Video compression has served as the enabling technology for a wide range of modern applications. One such application is Video on Demand (VoD), in which full length movies and videos are compressed, streamed, and delivered to viewers at their desired time, location, and devices. Due to increasing video data sizes and the need for new functionalities, various video compression techniques and standards have been developed. However, despite the availability of various compression standards, it remains a challenge to obtain consistently high compression while maintaining acceptable video quality. The difficulty is at least in part due to the wide range of video content types and characteristics, as different video content types may require different compression techniques for acceptable performance. Conventional compression techniques may be designed for specific content characteristics but come short of providing consistent high performance over a wide range of video content types.

BRIEF DESCRIPTION OF THE DRAWINGS

Various embodiments in accordance with the present disclosure will be described with reference to the drawings, in which.

DETAILED DESCRIPTION

Figure 1:
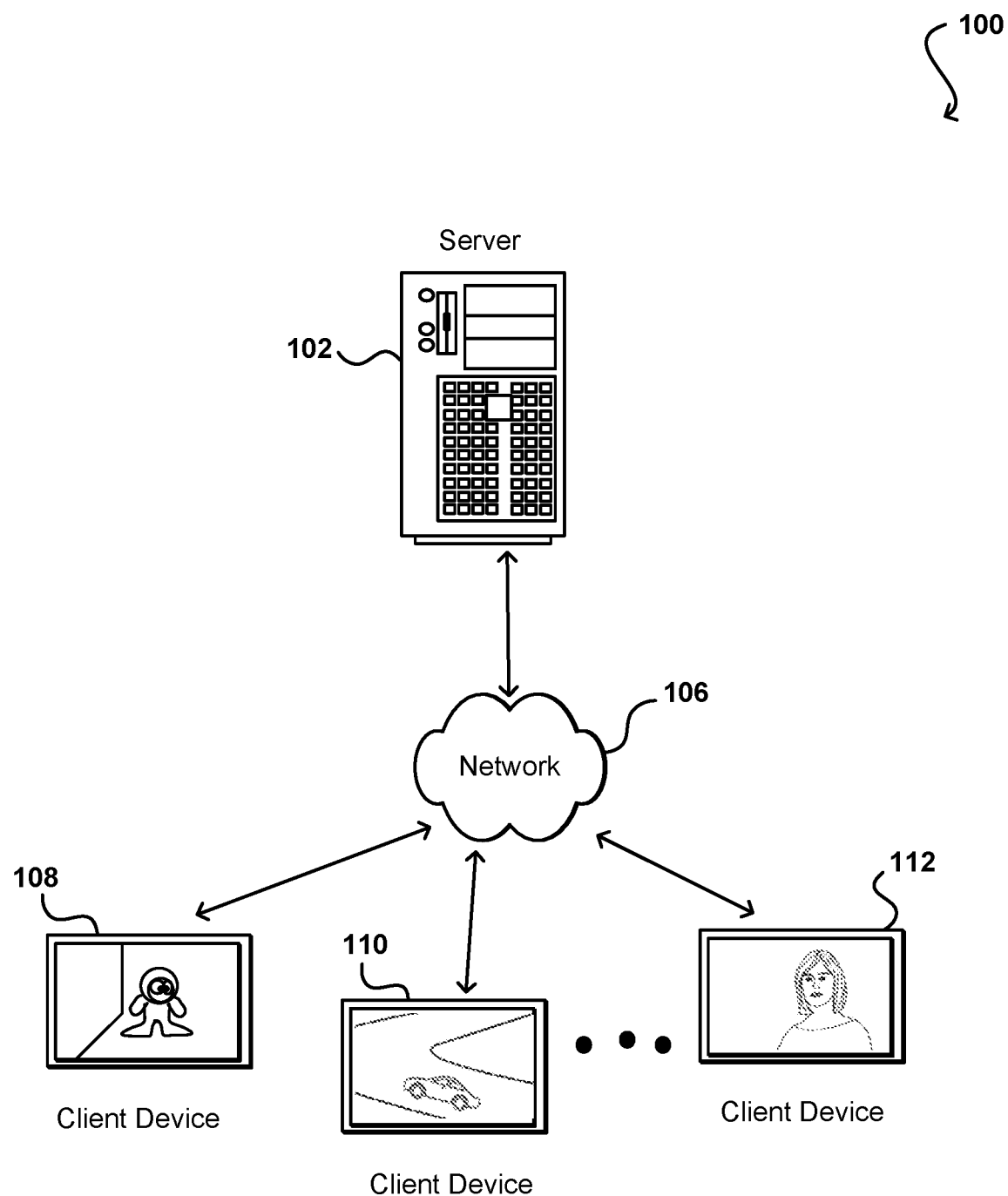
FIG. 1 illustrates an example of a networked computing system for video streaming that can be improved using the present techniques.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for data compression. In particular, various embodiments provide adaptive video compression techniques for automatically determining and applying a suitable compression standard for a given video data, such as entire video files or individual segments of a video file, based on one or more characteristics extracted from the video data. This may be performed automatically on the fly as video (e.g., movie, show, and clip) is requested by a user device, such that the user device receives consistently high quality video performance regardless of video content type.

In accordance with various embodiments, an adaptive video compression system may receive video data to be compressed, such as for delivery to a user device by a video streaming service. For example the video data may be an entire video file or a segment of a video file. The adaptive video compression system determines a suitable encoding scheme for compressing the video data. In order to determine the encoding scheme, the video data may be analyzed to extract a plurality of features interests of the video data, which may represent one or more characteristics of the video data. In various embodiments, the plurality of features may include one or more discriminating features, such as intra-frame complexity statistical features (i.e., features describing complexity within a frame), inter-frame statistical complexity (i.e., features describing complexity across frames), or other features that may be associated with or contribute to a determination of the suitable encoding scheme for the video data. For example, videos having a certain complexity characteristics may be more suitable for a first type of encoding scheme and a video having another type of complexity characteristics may be more suitable for a second type of encoding scheme. After the plurality of features of interests have been extracted from the video data, the features may be concatenated and collectively expressed as a feature vector. The feature vector is then used to determine a classification for the video data. Accordingly, an encoding scheme is determined for the video data based on the classification of the video data, and applied to video data to compress the video data. The compressed video data may then be transmitted to a user device over a network. In some embodiments, video data of a video file, such as a movie, may be analyzed, compressed, and transmitted in segments or a continuous data stream.

In various embodiments, the video may be initially encoded using an initial encoding technique to generate encoding analysis data. The encoding analysis data obtained from the initial encoding of the video data may be used to determine the plurality of discriminating features of the video data. In one example, fast look-ahead encoding can be used to obtain the encoding analysis data, in which data encoded sequentially with knowledge of a finite amount of future data. Various other data analysis techniques can be used to sample the video data and/or extract the features of interest. In some embodiments, the video data may be processed prior to feature extraction using down-sampling techniques, in which the sampling rate is decreased. For example, the video data may be down-sampled spatially to reduce the sampling rate of pixels within a frame of the video data. The video data may also be down-sampled temporally to reduce the sampling rate of frames in the video data. Various other processing techniques can be applied to the video data to facilitate extraction of the features of interests.

In various embodiments, a model may define a plurality of video classifications into which video data may be classified, and each video classification is assigned a certain encoding scheme that is suitable for encoding video data of that video classification. The model may also define how a given video data is classified into one of the plurality of video classifications. In one example, the model may classify video data based at least in part on the feature vector extracted of the video data, which may contain information regarding one or more features of interest as described above. The model may also include one or more model (i.e., representative, exemplary) feature vectors for each of the video classification such that the model can classify video data into one of the video classification based on how the feature vector of the video data compares to the model feature vectors of the video classification, and select the video classification whose model feature vector most closely resembles the feature vector of the video data (i.e., the model feature vector having the shortest distance from the feature vector of the video data).

The above-described model may be obtained through a machine learning process, such as an unsupervised learning process, in which the video classifications are defined based on clustering of training data. For example, the model may be trained using a plurality of sample video data, in which feature vectors for each of the sample video data is determined and clustering of the feature vectors is detected. A plurality of clusters may be defined based on certain criteria, thereby forming the video classifications. Specifically, in some embodiments, the model feature vector for a video classification may be derived from one or more of the feature vectors in the respective cluster, in which the model feature is representative of the cluster and/or video classification.

Various other features and application can be implemented based on, and thus practice, the above-described technology and presently disclosed techniques. Accordingly, approaches in accordance with various embodiments provide an improvement at least in data compression and streaming technology. Data compression and transmission, and particularly video streaming, represent significant advancements in computing and network technology. However, performance of video compression and transmission are bound by various resource limitations such as memory, bandwidth, and processing power, and rely on innovative computer based methods and ways of utilizing and manipulating resources to achieve new performance gains and raise the limits of what's possible. Improving the performance of video compression and being able to deliver high quality content through data streaming with minimal resource cost are both challenges that are unique to the realm of computing technology. The present disclosure provides an improvement to computing technology by aiming to resolve aspects of these computing challenges. Furthermore, the present techniques classify video data into encoding classes that are defined dynamically based on clustering of sample data. Specifically, the encoding classes are defined through unsupervised machine learning based on a combination of extracted video features, in which the clusters, and thus classes, are formed organically. Thus, the classification classes are also organic and data driven, rather than manually defined. Such clusters reveal ways to classify video data that may otherwise remain hidden. Thus, the techniques described herein further advance the functionality of computing systems. Accordingly, approaches in accordance with various embodiments improve the operation and performance of the computing device(s) on which they are implemented and with which they communicate. Various other applications, processes, and uses are presented below with respect to the various embodiments, each of which improves the operation and performance of the computing device(s) on which they are implemented.

FIG. 1 illustrates an example of a networked computing system 100 for video streaming that can be improved using the present techniques. In this example, a server 102, such as at a resource, service, or content provider can transmit video data to one or more client devices 108, 110, 112 such that video data can be rendered and played on the client devices 108, 110, 112. Client devices 108, 110, 112 include devices through which a user can watch, listen to, or read content, and include at least one form of input such as a keyboard or controller, and at least one form of output such as a display or speaker. The client devices 108, 110, 112 can include various computing devices such as smart phones, tablet computers, wearable computers (e.g., smart glasses or watches), desktop or notebook computers, and the like. The client devices 108, 110, 112 can communicate with the gaming server 102 over at least one network 106, such as the Internet, a cellular network, a local area network (LAN), an Ethernet, Wi-Fi, or a dedicated network, among other such options, such that the client devices 108, 110, 112 can communicate with the provider server 102. For example, a client device 108 may request video data such as a full length movie, a show, or a clip, from the server 102. The server 102 may then transmit the video data to the client device. The video data may be transmitted to the client device 108 through various methods such as via downloading or streaming. Typically, in transmission by downloading, the entire data file is transmitted from the server 102 to the client device 108 before it is executed by the client device 108. Thus, a user may have to wait for the entire file to finished downloading before being able to begin watching the video, or otherwise access the data content. Additionally, the client device may need to store the entire size of the file in memory. In contrast, in transmission by streaming, data is transmitted in an executable sequence, in which the data can be rendered at the client device 108 as it is received, thereby allowing the user to watch the video as it is transmitted. Additionally, the data may be deleted from the client device shortly or immediately after it is rendered. Thus, streaming video has many advantages, including reduced latency and reduced memory, both of which improve the user experience and capabilities of the client devices 108, 110, 112. However, the current state of video transmission technology, including video streaming is not without performance limitations, in part due to resource constraints such as memory, bandwidth, and computing power. In an effort to improve video transmission, video data may be encoded before transmission, which can reduce the amount of data that needs to be transmitted, also known as compression. Due to increasing video data sizes and the need for new functionalities, various video compression techniques and standards have been developed, such as MPEG-1, MPEG-2, MPEG-4, AVC/H.264, HEVC/H.265, as well as open-source codecs like VP9 and AV1. However, despite the availability of various compression standards, it remains a challenge to obtain consistently high compression while maintaining acceptable video quality. The difficulty is at least in part due to the wide range of video content types and characteristics (as illustrated on the client devices 108, 110, 112), as different video content types may require different compression techniques for acceptable performance. For example, an animated video with relatively simple graphics and few colors may require different encoding to achieve acceptable quality then a live action video with a great amount of variability within frames and between frames. Conventional compression techniques may be designed for specific content characteristics but come short of providing consistent high performance over a wide range of video content types. The present systems and methods provide adaptive video compression techniques for automatically determining and applying a suitable compression standard for a given video data, such as entire video files or individual segments of a video file, based on one or more characteristics extracted from the video data. This may be performed automatically on the fly as video (e.g., movie, show, clip) is requested by a user device, such that the user device receives consistently high quality video performance regardless of video content type or varying content type within the same video.

Figure 2:
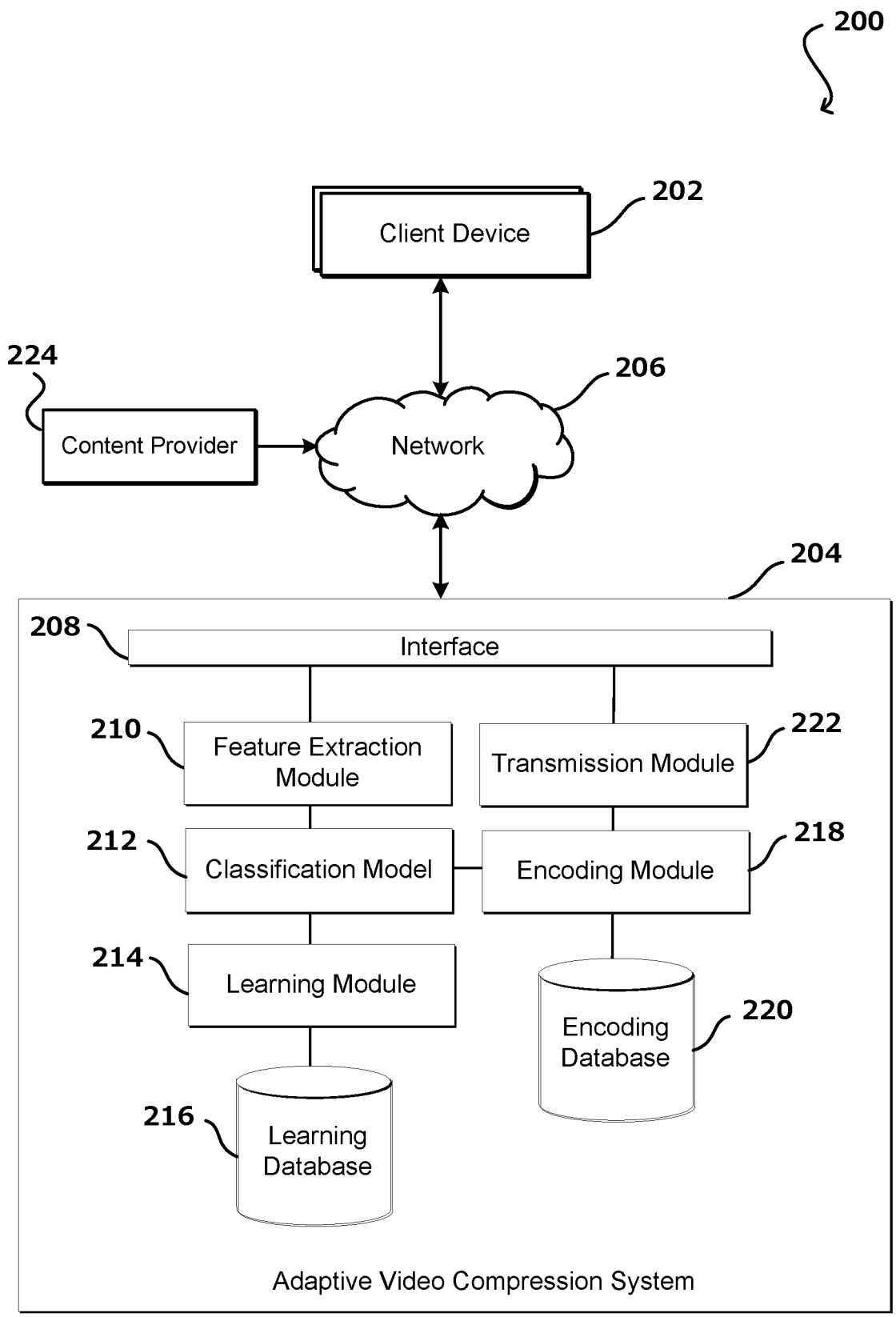
FIG. 2 illustrates an example computing system for adaptive video compression, in accordance with various embodiments of the present disclosure.

FIG. 2 illustrates an example computing system 200 for adaptive video compression, in accordance with various embodiments of the present disclosure. In various embodiments, a system 200 may enable a client device 202 to receive compressed video data directly or indirectly from an adaptive video compression system 204. The device client 202 may access a content provider 224, such as a video streaming service or other web platform or service providing streaming video content, to request the video content to be streamed to the client device so that the video content can be played on the client device 202 and viewed by a user. In some embodiments, the adaptive video compression system 204 may be implemented at one or more servers at the content provider 224, such that the content provider 224 utilizes the adaptive video compression system 204 to compress video data before streaming to the client device 202. In some other embodiments, the adaptive video compression system 204 may be implemented remote from the content provider 224, such that the content provider 224 provides the video data and file to the adaptive video compression system, the adaptive video compression system compresses the video data and either transmits the compressed data back to the content provider 224 or directly to the client device 202. The client device 202 may represent a client-side computer device that includes any type of computing devices having network connectivity, including personal computers, tablet computers, smart phones, notebook computers, and the like. Multiple client devices 202 may be connected to the adaptive video compression system 204 via the network 206, and the adaptive video compression system 204 may provide individualized service to each client device 202, such as based on the type of client device. In some embodiments, the client device 202 may be a virtual device, Web program, or software application that can communicate with the adaptive video compression system 204 directly or over the network 206, making and receiving requests and calls, and sending and receiving data. The network 206 can include any appropriate network, such as the Internet, a local area network (LAN), a cellular network, an Ethernet, Wi-Fi, Bluetooth, radiofrequency, or other such wired and/or wireless network. The adaptive video compression system 204 can include any appropriate resources for performing the various functions described herein, and may include various servers, data stores, and other such components known or used for providing content from across a network (or from the "cloud"). In various embodiments, the adaptive video compression system 204 may include functional and data aspects illustrated herein as an interface 208, a feature extraction module 210, a classification module 212, a training module 214, a training database 216, an encoding module 218, an encoding database 220, and a transmission module 222. One or more of the modules and databases described above may be implemented jointly or separated further into additional modules. For example, the interface 208 can facilitate communication between the client device 202 and the adaptive video compression system 204. Requests received by the adaptive video compression system 204 can be received by the interface 208. Example requests may include a request for data, a request to jump to a specific portion, a request to pause or stop the data stream, among others. The interface 208 may also provide outputs from the adaptive video compression system 204 to the client 302, such as compressed video data as a data stream. The adaptive video compression system 204 may receive video data or file to be compressed from the content provider 202 via the interface 208. The interface 208 may also include components such as specific application programming interfaces (APIs), load balancers, request and/or data routers, and the like. The interface 208 may also facilitate communication with the content provider 202, whether local or remote. In accordance with various embodiments, an adaptive video compression system may receive video data to be compressed, such as for delivery to a user device by a video streaming service. For example the video data may be an entire video file or a segment of a video file. The adaptive video compression system determines a suitable encoding scheme for compressing the video data. In order to determine the encoding scheme, the video data may be analyzed to extract a plurality of features interests of the video data, which may represent one or more characteristics of the video data. Thus, the feature extraction module 210 may receive the video data and performs various processing and analysis to extract the features of interest. The plurality of features may include one or more discriminating features, such complexity characteristics of the video data. The complexity characteristics may include intra-frame complexity statistical features (i.e., features describing complexity within a frame), inter-frame statistical complexity (i.e., features describing complexity across frames), or other features that may be associated with or contribute to a determination of the suitable encoding scheme for the video data. For example, videos having a certain complexity characteristics may be more suitable for a first type of encoding scheme and a video having another type of complexity characteristics may be more suitable for a second type of encoding scheme. In various embodiments, the video data may be undergo some initial processing to facilitate extraction of the features. For example, the video data may be initially encoded using an initial encoding technique to generate encoding analysis data. The encoding analysis data obtained from the initial encoding of the video data may be used to determine the plurality of discriminating features of the video data. In one example, fast look-ahead encoding can be used to obtain the encoding analysis data, in which data encoded sequentially with knowledge of a finite amount of future data. Various other data analysis techniques can be used to sample the video data and/or extract the features of interest. In some embodiments, the video data may be processed prior to feature extraction using down-sampling techniques, in which the sampling rate is decreased. For example, the video data may be down-sampled spatially to reduce the sampling rate of pixels within a frame of the video data. The video data may also be down-sampled temporally to reduce the sampling rate of frames in the video data. Various other processing techniques can be applied to the video data to facilitate extraction of the features of interests. In some embodiments, after the plurality of features of interests have been extracted from the video data, the features may be concatenated and collectively expressed as a feature vector. The classification model 212 may analyze the extracted features or the feature vector to determine a classification (i.e. encoding class) for the video data. In various embodiments, the model may define a plurality of encoding classes into which video data may be classified, and each encoding class is assigned a certain encoding scheme that is suitable for encoding video data of that video classification. The model may also define how a given video data is classified into one of the plurality of encoding classes. In one example, the model may classify video data based at least in part on the feature vector extracted of the video data, which may contain information regarding one or more features of interest as described above. The model may also include one or more model (i.e., representative, exemplary) feature vectors for each of the encoding classes such that the model can classify video data into one of the encoding classes based on how the feature vector of the video data compares to the model feature vectors of the encoding classes, and select the encoding class whose model feature vector most closely resembles the feature vector of the video data (i.e., the model feature vector having the shortest distance from the feature vector of the video data). The classification model 212 may be obtained through a machine learning process, such as an unsupervised learning process provided by the learning module 214, in which the video classifications are defined based on clustering of sample video data. For example, the model may be trained using a plurality of sample video data, in which feature vectors for each of the sample video data is determined and clustering of the feature vectors is detected. A plurality of clusters may be defined based on certain criteria, thereby forming the encoding classes. Specifically, in some embodiments, the model feature vector for an encoding class may be derived from one or more of the feature vectors in the respective cluster, in which the model feature is representative of the cluster and/or encoding class. In some embodiments, the feature vectors of the sample video data may be stored in the learning database 216. The learning database 216 may store any data related to the training of the classification model and may also include the determined encoding classes obtained through the learning and the respective one or more model features vectors of each encoding class. Accordingly, the encoding module 218 then encodes the video data using the designated encoding scheme for the encoding class into which the video data is classified, thereby compressing video data. In some embodiments, data related to the encoding scheme, such as the encoding algorithm, may be stored in the encoding database 220, which is accessed by the encoding module 218 to encode the video data. The transmission module 222 may receive the encoded video data and transmit the encoded video data to the client device 202 over the network 206. The adaptive video compression system 204 may include additional modules for carrying out various other optional functionalities. One or more of the modules and databases described above may be implemented jointly or separated further into additional modules. In some embodiments, the adaptive video compression system 204 may be implemented on a computing device or a network of server computing devices that includes one or more processors and one or more memory which may contain software applications executed by the processors. The features and services provided by the adaptive video compression system 204 may be implemented as a web services consumable via a communication network. In further embodiments, the adaptive video compression system 204 can be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 3:
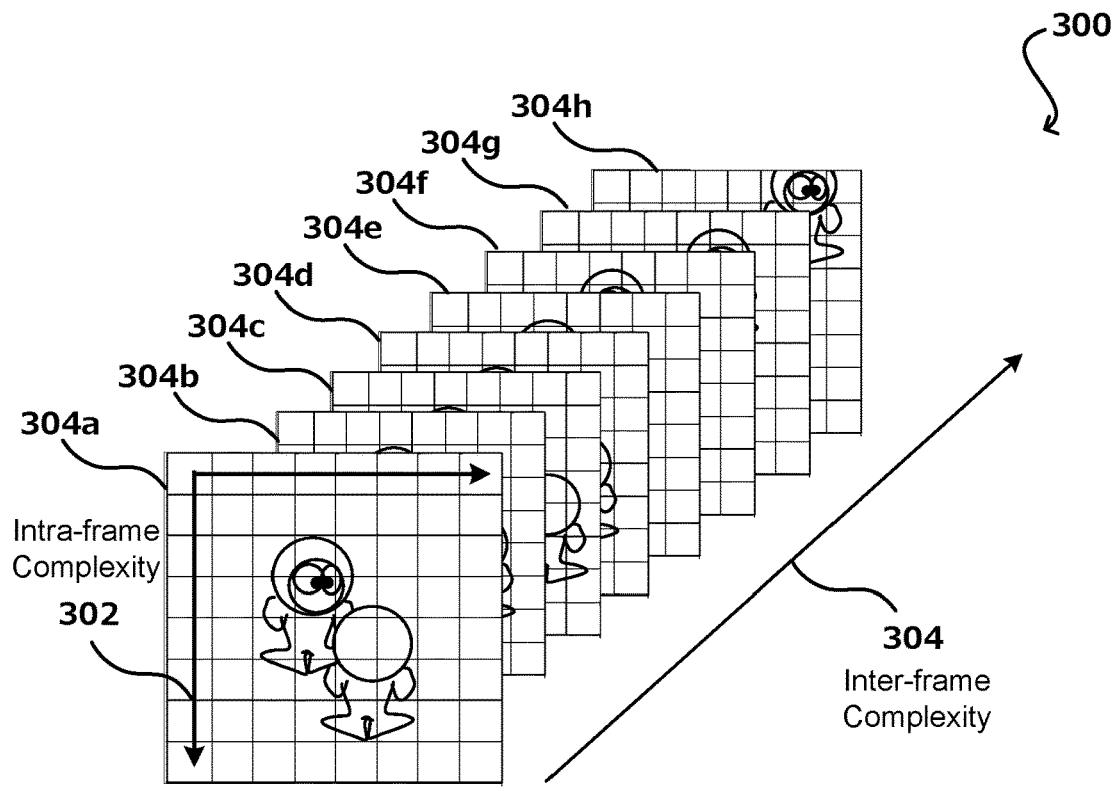
FIG. 3 illustrates an example visual representation of complexity characteristics for adaptive video compression, in accordance with various embodiments of the present disclosure.

FIG. 3 illustrates an example visual representation 300 of complexity characteristics for adaptive video compression, in accordance with various embodiments of the present disclosure. As mentioned above, the features of the video data used in determining an encoding class for a given video may include various complexity-based features, or various measures of complexity in the video data. As illustrated in FIG. 3, two types of complexity are intra-frame complexity 302, which describes complexity within a frame 304$a$, and inter-frame complexity 306, which describes complexity across frames 304$a$-$h$. For example, an intra-frame complexity feature 302 may describe how much pixel variation is present in a frame 304$a$ of the video data or the total number of different colors present in the frame 304$a$. The intra-frame complexity feature 302 of each sampled frame may be averaged to obtain a measure of an intra-frame complexity feature 302. Inter-frame complexity may include a measure of how much pixels change between multiple frames. For example, in one video, 80% of pixels change colors between two sampled frames and in another video, only 20% of pixels change colors between two sampled frames. In illustrative example, a video having frame with many colors distributed at high variation may require a different encoding scheme or settings than a video with frames in which there are few colors and pixels are the same color are relatively grouped together. Thus, extracting such features can be used to facilitate classification of video data. Example measures of complexity that may be extracted features predictive frame complexity, bi-directional complexity, motion vector complexity, among others. Intra-frame complexity and inter-frame complexity may also be associated with spatial and temporal complexity, respectively.

Figure 4:
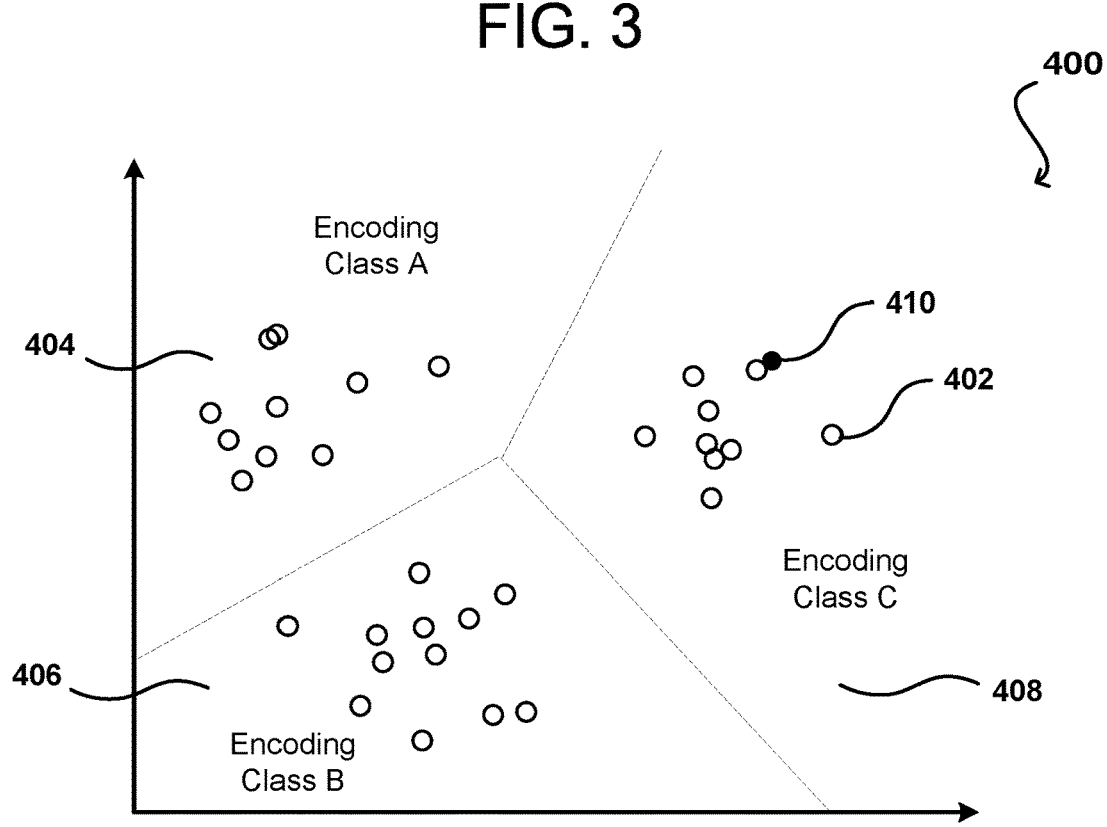
FIG. 4 illustrates an example visual representation of cluster-based encoding classes for adaptive video compression, in accordance with various embodiments of the present disclosure.

FIG. 4 illustrates an example visual representation 400 of cluster-based encoding classes for adaptive video compression, in accordance with various embodiments of the present disclosure. As discussed above, the encoding classes into which a video is classified may be defined by detected clustering of feature vectors of sample video data. FIG. 4 illustrates a simplified representation of such clustering. Specifically, white dots representing feature vectors 402 of the sample videos are plotted, forming clusters 404, 406, and 408. Clustering signals that the feature vectors 402 in a certain cluster may be generally or holistically similar with respect to the features in the feature vector, and may be suitable for the same encoding scheme or settings. Thus, the clusters are used to define the encoding classes, with one cluster defining one encoding class. In some embodiments, a centroid feature vector from each of the clusters may be defined as a model feature vector used to classify queried featured vectors. In some embodiments, it may be recognized that more than one cluster may be suitable for the same encoding scheme. Thus, in such cases, those clusters may be defined as a single encoding class. During use, the feature vector 410 of a given video is determined and plotted against the clusters 404, 406, and 408 to see which cluster the feature vector 410 falls into, thus determining the encoding class and appropriate encoding scheme. The encoding classes are learned through unsupervised learning based on a combination of extracted video features, in which the clusters are formed organically, and the classification classes are also organic and data driven, rather than manually defined. Thus, the clusters reveal effective ways to classify video data that may otherwise remain hidden.

Various clustering based analysis techniques can be used herein. For example, some such techniques may include connectivity models, such as hierarchical clustering, which builds models based on distance connectivity; centroid models, such as which k-means algorithm represents each cluster by a single mean vector; distribution models, in which clusters are modeled using statistical distributions, such as multivariate normal distributions used by the expectation-maximization algorithm; density models, such as DBSCAN and OPTICS, which defines clusters as connected dense regions in the data space; subspace models, such as in bi-clustering (also known as co-clustering or two-mode-clustering), in which clusters are modeled with both cluster members and relevant attributes; group models, which some algorithms do not provide a refined model for their results and just provide the grouping information; graph-based models, such as a clique, that is, a subset of nodes in a graph such that every two nodes in the subset are connected by an edge can be considered as a prototypical form of cluster; neural models, such as unsupervised neural network which includes a self-organizing map. In some embodiments, a cluster may include a set of such clusters, in example in a hierarchy of clusters.

Figure 5:
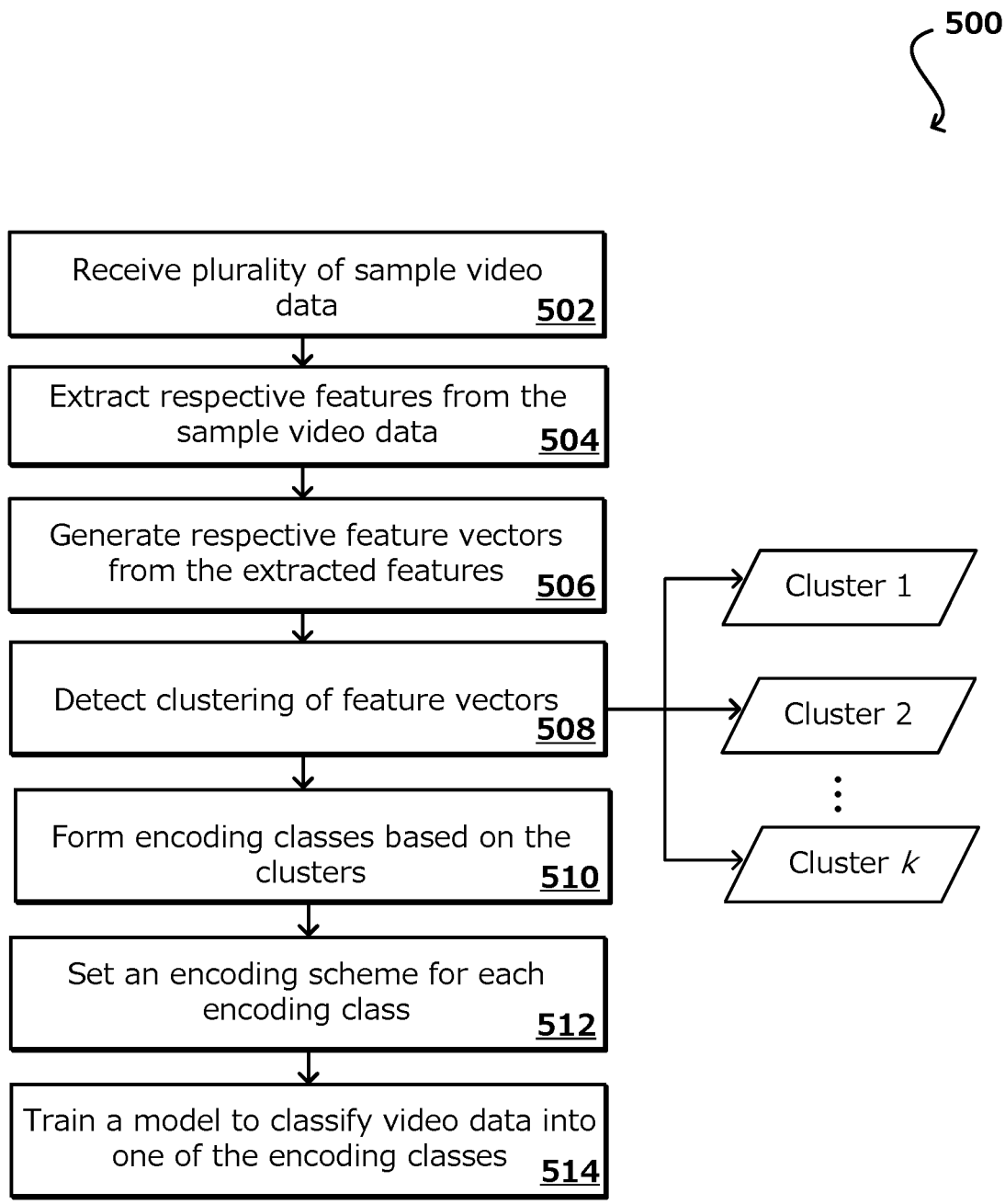
FIG. 5 illustrates an example process for training an adaptive video compression system, in accordance with various embodiments of the present disclosure.

FIG. 5 illustrates an example process 500 for training an adaptive video compression system, in accordance with various embodiments of the present disclosure. It should be understood that, for any process discussed herein, there can be additional, fewer, or alternative steps performed in similar or alternative orders, or in parallel, within the scope of the various embodiments unless otherwise stated. In this example, a plurality of sample video data may be received 502, and relevant features may be extracted 504 from each of the plurality of sample data. The same data may be individual video files or video data segments. A feature vector may be generated 506 for each sample video based on the extracted features. Clusters of the feature vectors may be detected 508, and encoding classes may be formed 510 based on the detected clusters. An encoding scheme, include various encoding techniques and/or settings, may then be set 512 for each of the encoding classes, such that the encoding scheme for a specific encoding class is suitable for encoding videos classified into that encoding class. A model can then be trained 514 to classify video data into one of the encoding classes based on the relevant features of the video data.

Figure 6:
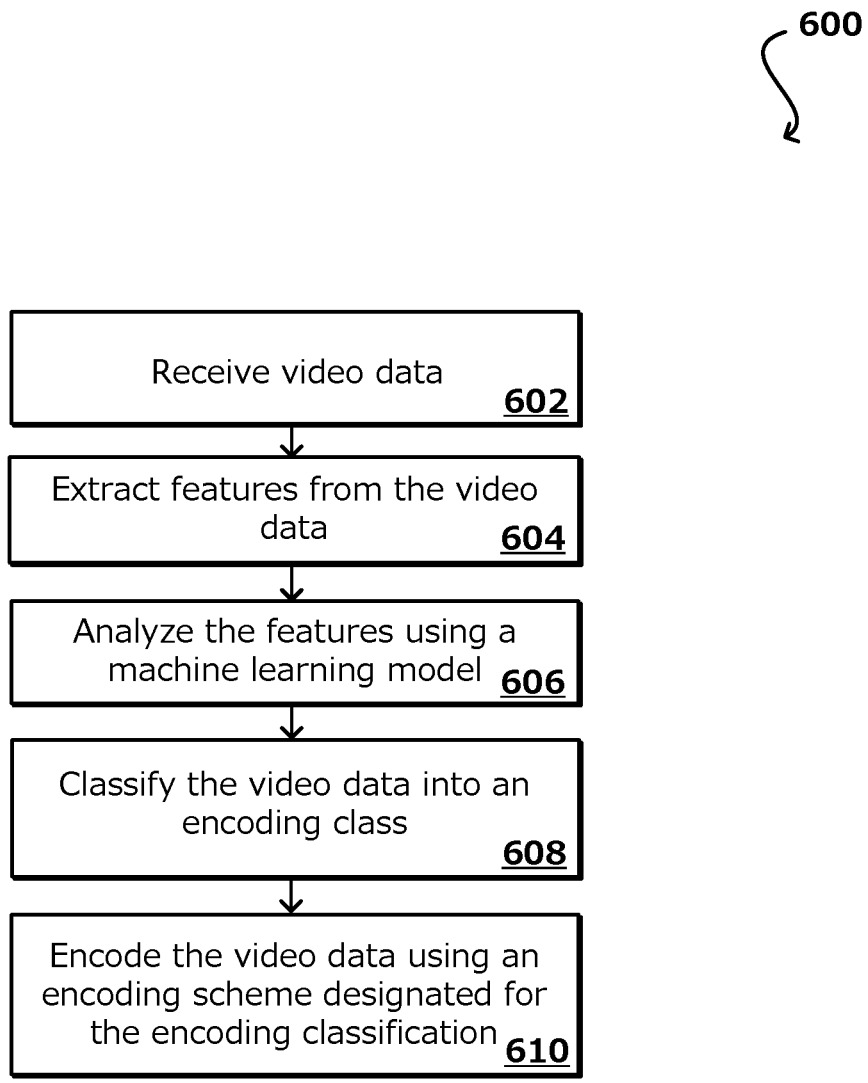
FIG. 6 illustrates an example process for adaptive video compression, in accordance with various embodiments of the present disclosure.

FIG. 6 illustrates an example process 600 for adaptive video compression, in accordance with various embodiments of the present disclosure. In this example, video data that is to be compressed is received 602 and relevant features are extracted 604 from the video data. A machine learning model may then be used to analyze 606 the extracted features. The video data is then classified 608 into an encoding class based on the extracted features. In some embodiments, the machine learning model determines the encoding classed based on how the extracted features compare to model features of the encoding classes. Once the encoding class is determined, the video data is encoded 610 using the encoding scheme designated for the determined encoding class.

Figure 7:
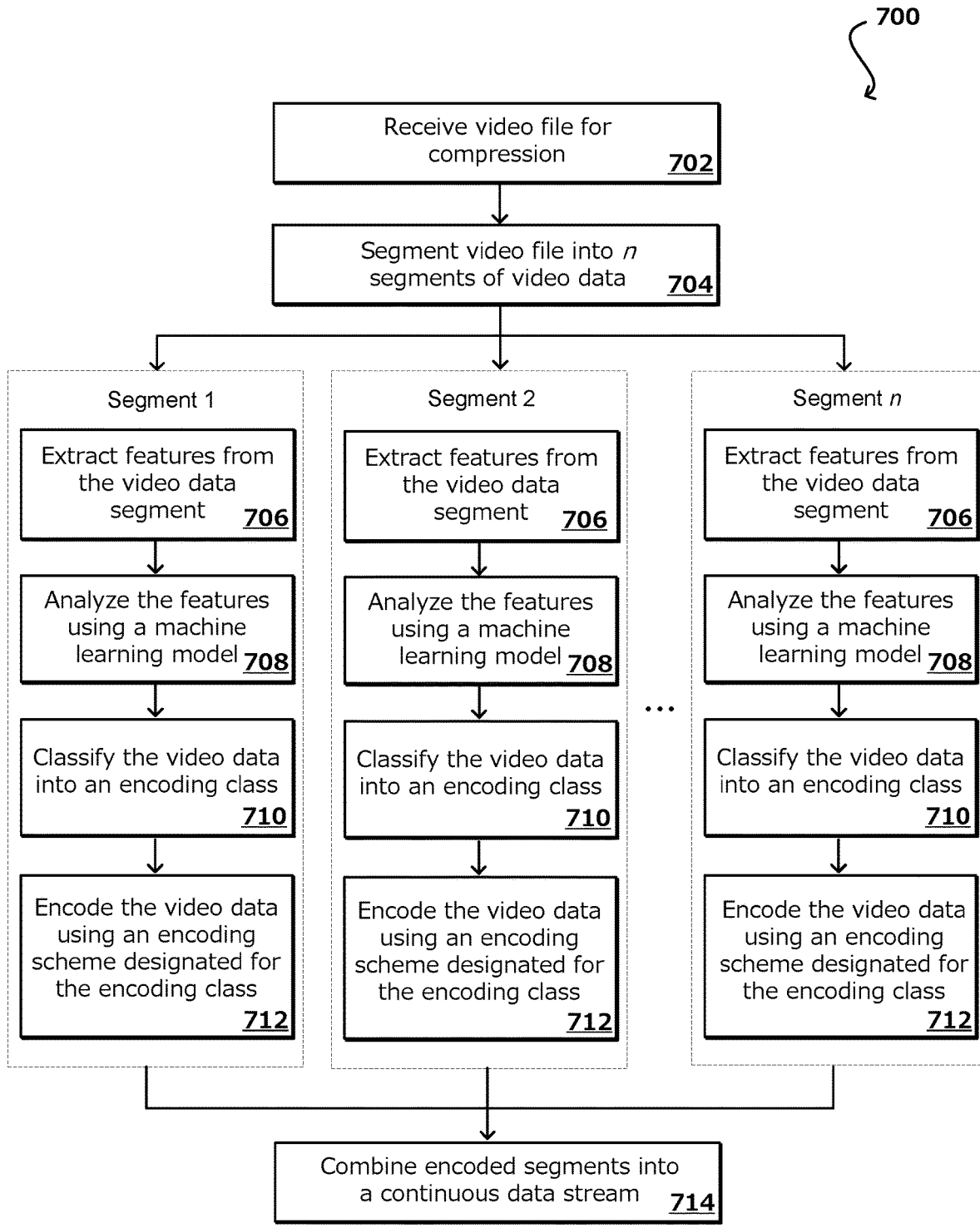
FIG. 7 illustrates an example process for adaptive video compression by video segments, in accordance with various embodiments of the present disclosure.

FIG. 7 illustrates an example process 700 for adaptive video compression by video segments, in accordance with various embodiments of the present disclosure. In this example, a video file that is to be compressed is received 702. The video file may be segmented 704 into multiple segments of video data. In some embodiments, the video may be segmented based on their contents, such as may be determined using short detection or other automatic visual scene analysis. In some embodiments, the video may be segmented based on encoder-determined compression characteristics. Each segment of the video file may be individually analyzed and encoding based on its features. Specifically, for each segment, features are extracted 706 from the video data of the segment, the features are analyzed 708 using a machine learning model, the segment is classified 710 into an encoding class, and the segment of video data is encoded 712 using an encoding scheme designated for the respective encoding class. Thus, the segments of a single file may be encoding using different encoding scheme, based on the characteristics of each segment. The encoded segments may then be combined 714 together as a continuous data stream that can be transmitted to a client device.

Figure 8:
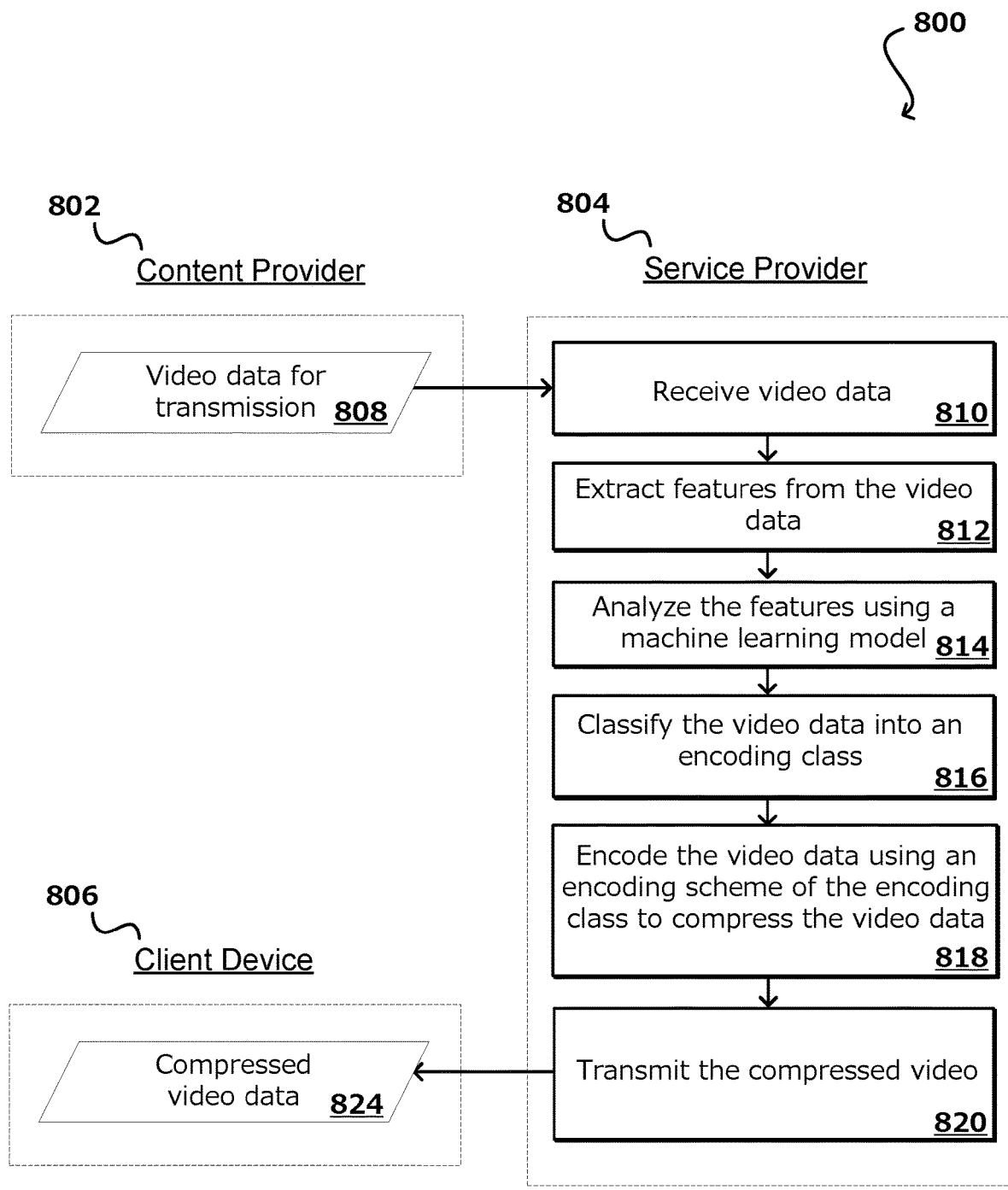
FIG. 8 illustrates an example process for multi-party adaptive video compression, in accordance with various embodiments of the present disclosure.

FIG. 8 illustrates an example process 800 for multi-party adaptive video compression, in accordance with various embodiments of the present disclosure. In this example, a service provider 804 compresses video for a content provider 802 using the methods and system described herein and delivers the video directly to a client device 806 on behalf of the content provider 802. Specifically, video data 808 that is to be compressed is received 810 at a service provider 804 from the content provider 802 for compression. Thus, at the service provider 804, relevant features are extracted 812 from the video data. A machine learning model may then be used to analyze 814 the extracted features. The video data is then classified 816 into an encoding class based on the extracted features. In some embodiments, the machine learning model determines the encoding classed based on how the extracted features compare to model features of the encoding classes. Once the encoding class is determined, the video data is encoded 818 using the encoding scheme designated for the encoding class to compress the video data. The compressed video 824 is then transmitted 820 to a client device 824.

Figure 9:
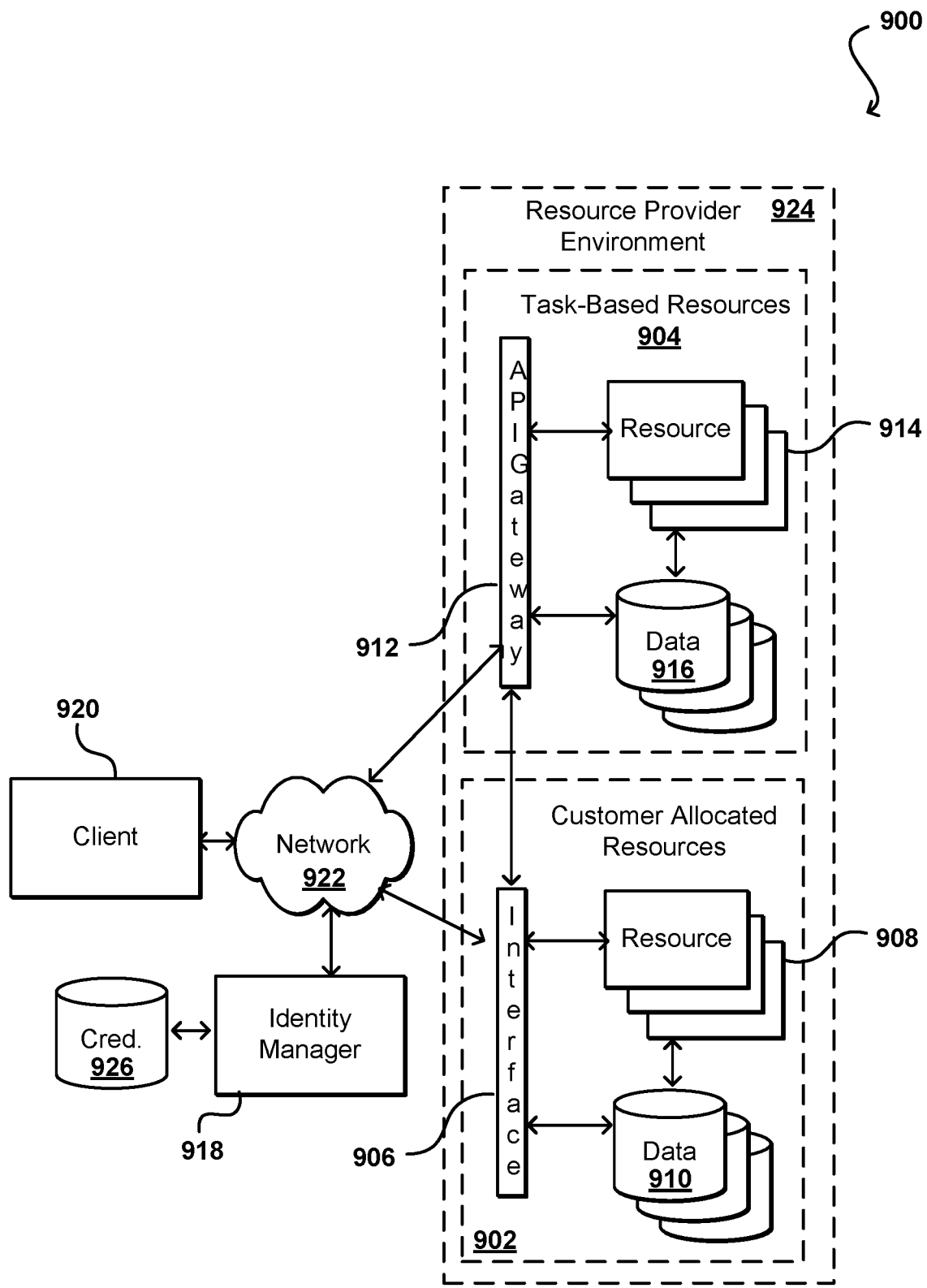
FIG. 9 illustrates an example resource provider environment in which adaptive video compression can be implemented, in accordance with various embodiments of the present disclosure.

FIG. 9 illustrates an example resource provider environment in which adaptive video compression can be implemented, in accordance with various embodiments of the present disclosure. FIG. 9 illustrates an example environment 900 in which aspects of the various embodiments can be implemented. A client device 920 may access or utilize a resource provider environment 924 on which an adaptive compression system is implemented, such that the resource provider environment 924 can compress video data for transmission to the client device 920. In this example, the client device 920 is able to submit requests, including a request for video content to a multi-tenant resource provider environment 924. In some embodiments, the multi-tenant resource provider environment 924 may host, or otherwise provide, the adaptive compression system. For example, one or more of the resources described below may be used to implement the interface 208, the feature extraction module 210, the classification module 212, the training module 214, the training database 216, the encoding module 218, the encoding database 220, and the transmission module 222. The client device 920 can include any appropriate electronic device operable to send and receive requests, messages, or other such information over an appropriate network and convey information back to a user of the device. Examples of such client devices include personal computers, tablet computers, smart phones, notebook computers, and the like. The at least one network 922 can include any appropriate network, including an intranet, the Internet, a cellular network, a local area network (LAN), or any other such network or combination, and communication over the network can be enabled via wired and/or wireless connections. The resource provider environment 924 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the resource provider environment 924 may include various types of resources that can be utilized by users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a resource provider environment 924 is often referred to as resource sharing, Web services, or "cloud computing," among other such terms and depending upon the specific environment and/or implementation. In this example the resource provider environment 924 includes a plurality of resources 908 of one or more types. These types can include, for example, application servers operable to process instructions provided by a user or database servers operable to process data stored in one or more data stores 910 in response to a user request. A user may include the client 920. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources can submit a request that is received to an interface layer of the resource provider environment 924. The interface layer can include application programming interfaces (APIs) or other exposed interfaces enabling a user to submit requests to the provider environment. The interface layer 906 in this example can also include other components as well, such as at least one Web server, routing components, load balancers, and the like. When a request to provision a resource is received to the interface layer, information for the request can be directed to a resource manager or other such system, service, or component configured to manage user accounts and information, resource provisioning and usage, and other such aspects. A resource manager may include identity manager 918 for receiving the request can perform tasks such as to authenticate an identity of the user submitting the request, as well as to determine whether that user has an existing account with the resource provider, where the account data may be stored in at least one data store in the provider environment. A user can provide any of various types of credentials 926 in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The client can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes.

The resource manager (or another such system or service) in this example can also function as a virtual layer of hardware and software components that handles control functions in addition to management actions, as may include provisioning, scaling, replication, etc. The resource manager can utilize dedicated APIs in the interface layer, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer in at least one embodiment includes a scalable set of client-facing servers that can provide the various APIs and return the appropriate responses based on the API specifications. The interface layer also can include at least one API service layer that in one embodiment consists of stateless, replicated servers which process the externally-facing client APIs. The interface layer can be responsible for Web service front end features such as authenticating clients based on credentials, authorizing the client, throttling client requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, clients of the control service. The servers of the Web services layer can be stateless and scaled horizontally as known in the art. API servers, as well as the persistent data store, can be spread across multiple data centers in a region, for example, such that the servers are resilient to single data center failures.

As mentioned, the resources in such an environment can be allocated for any of a number of different purposes for performing a variety of different tasks, including receiving a query image, classifying the query image, determining whether the query image is a restricted image, among others. The client 920 can access a customer allocated resource environment 902, or sub-environment. The client can provide access to the various resources to users (e.g., employees or contractors) under the credentials or roles for that account. In this example, there can be a set of resources, both computing resources 908 and data resources 910, among others, allocated on behalf of the client in the resource provider environment. These can be physical and/or virtual resources, but during the period of allocation the resources (or allocated portions of the resources) are only accessible using credentials associated with the client account. These can include, for example, servers and databases that are utilized over a period of time for various client applications. The client 920 can also make calls into an API gateway 912, or other such interface layer, of a task-based resource environment 904, or sub-environment. In such an environment, as is discussed in more detail later herein, portions of various resources such as computing resources 914 and data resources 916 can be allocated dynamically and on a task-specific basis. There can be resources allocated to perform a specific type of processing, and those resources can be allocated on an as-needed basis where the client is only charged for the actual processing in response to a specific task.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a client (or other authorized user) for a period of time in order to process tasks on behalf of that client. In many cases, however, a client may not have a steady flow of work such that the client must maintain a sufficient number of virtual machines to handle peak periods of work but will often have less than this amount of work. This can result in underutilization and unneeded expense for both the client and the resource provider. Approaches in accordance with various embodiments can instead allocate resource instances on a task or event basis to execute a function. A resource instance can be allocated to run a function in response to a client request or event, including receiving a video for compression, extracting features, ana-lyzing the features, classifying the video, encoding the video data, transmission of the video data, and any other function performed by the adaptive compression system. Once the function has completed that instance can either be made available for processing a different event or destroyed, among other such options. In either case, the client will not be charged for more processing by the instance than was needed to run the function.

Figure 10:
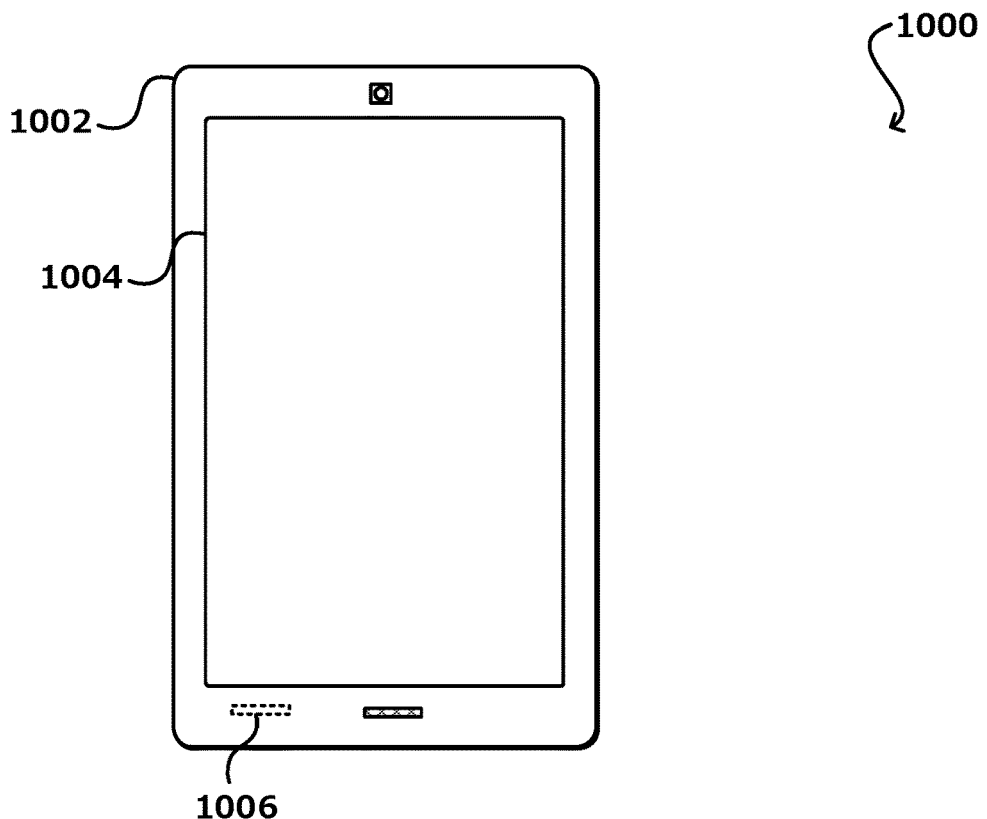
FIG. 10 illustrates an example computing device that can be utilized, in accordance with various embodiments of the present disclosure.

FIG. 10 illustrates an example computing device that can be utilized, in accordance with various embodiments of the present disclosure. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 1000 has a display screen 1004 and an outer casing 1002. The display screen under normal operation will display information to a user (or viewer) facing the display screen (e.g., on the same side of the computing device as the display screen). As discussed herein, the device can include one or more communication components 1006, such as may include a cellular communications subsystem, Wi-Fi communications subsystem, BLUETOOTH® communication subsystem, and the like.

Figure 11:
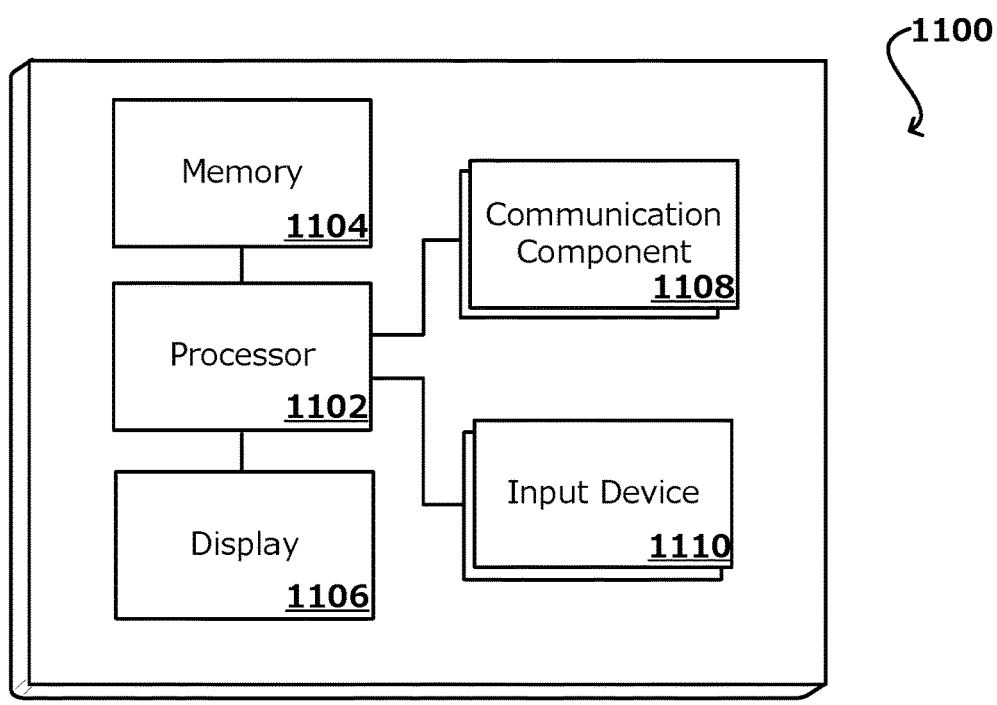
FIG. 11 illustrates an example configuration of components of a computing device, such as the device illustrated in FIG. 10, in accordance with various embodiments of the present disclosure.

FIG. 11 illustrates an example configuration of components of a computing device 1100, such as the device illustrated in FIG. 8, in accordance with various embodiments of the present disclosure. In this example, the device includes at least one processor 1102 for executing instructions that can be stored in a memory device or element 1104. As would be apparent to one of ordinary skill in the art, the device can include many types of memory, data storage or computer-readable media, such as a first data storage for program instructions for execution by the at least one processor 1102, the same or separate storage can be used for images or data, a removable memory can be available for sharing information with other devices, and any number of communication approaches can be available for sharing with other devices. The device typically will include at least one type of display element 1106, such as a touch screen, electronic ink (e-ink), organic light emitting diode (OLED) or liquid crystal display (LCD), although devices such as portable media players might convey information via other means, such as through audio speakers. The device can include at least one communication component 1108, as may enabled wired and/or wireless communication of voice and/or data signals, for example, over a network such as the Internet, a cellular network, a Wi-Fi network, BLUETOOTH®, and the like. The device can include at least one additional input device 1110 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 12:
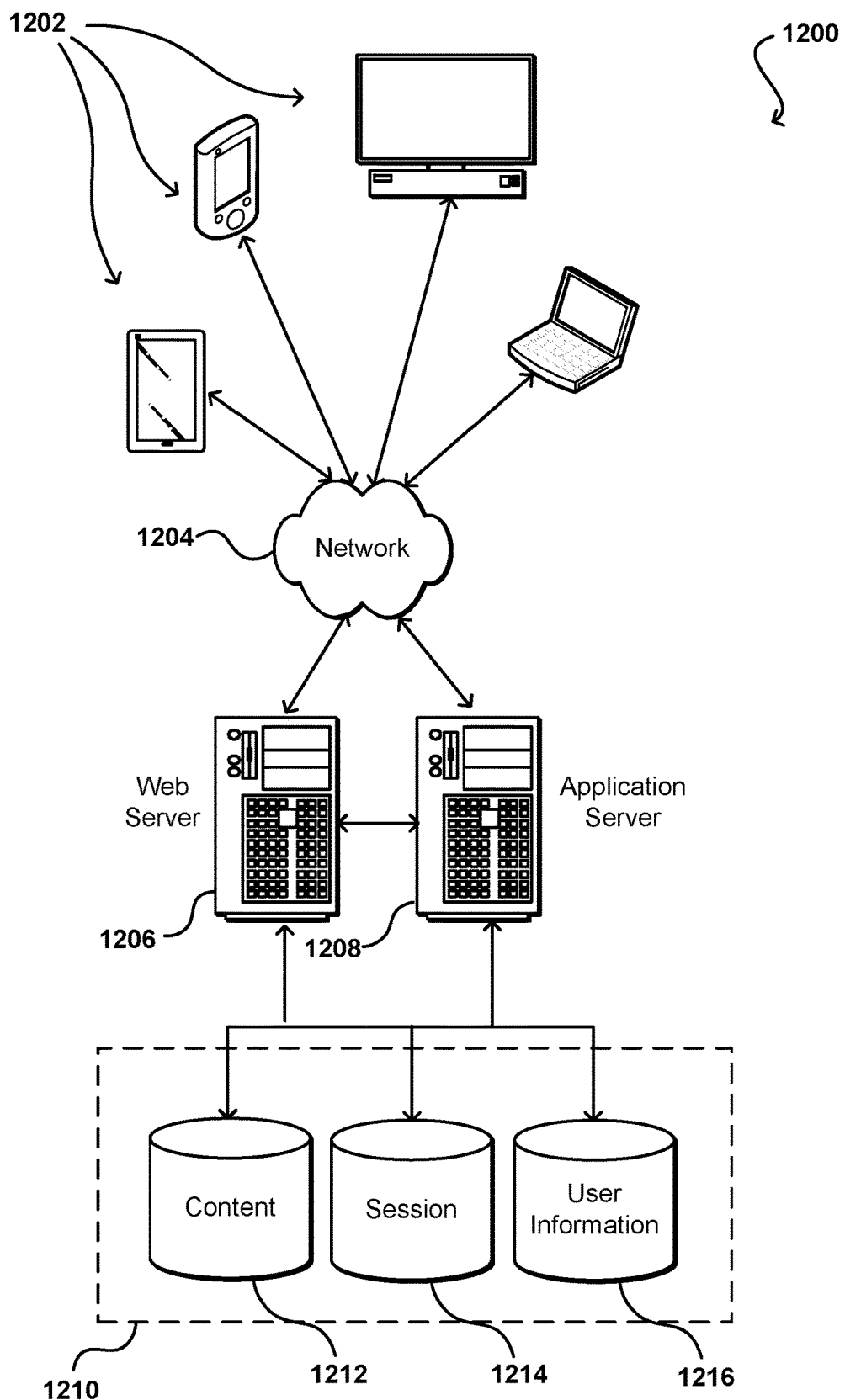
FIG. 12 illustrates an example networked system that can be utilized, in accordance with various embodiments of the present disclosure.

FIG. 12 illustrates an example networked system that can be utilized, in accordance with various embodiments of the present disclosure. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art. The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein. The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining one or more feature values of video data;
   analyzing the one or more feature values using a model trained to classify the video data into one of a plurality of classes associated with a plurality of respective encoding schemes, wherein the plurality of classes correspond to a plurality of clusters of sample video data formed during unsupervised training of the model the encoding scheme of a class determined based at least in part on feature values of sample video data in the cluster that corresponds to the class;
   classifying the video data into a class selected from the plurality of classes using the model, the class associated with an encoding scheme; and
   encoding the video data using the encoding scheme.

2. The method of claim 1, further comprising:
   down-sampling the video data to reduce the sampling rate of the video data.

3. The method of claim 1, further comprising:
   processing the video data using a preliminary encoding process to compress the video data and determine at least one of the one or more feature values.

4. The method of claim 1, wherein the one or more feature values includes one or more video complexity values.

5. The method of claim 4, wherein the one or more video complexity values includes a degree of complexity within a frame of the video data and a degree of complexity between multiple frames of the video data.

6. The method of claim 1, further comprising:
   obtaining the plurality of sample video data;
   determining respective feature vectors for the plurality of sample video data;
   determining a plurality of clusters of features vectors;
   defining the plurality of classes based on the plurality of clusters; and
   associating the plurality of classes with respective encoding schemes.

7. The method of claim 6, further comprising:
   determining respective model feature vectors for the plurality of classes, wherein the model includes at least the plurality of classes and respective model feature vectors;
   generating a feature vector for the received video data;
   comparing the feature vector to the model feature vectors to determine the class of the received video data.

8. The method of claim 1, further comprising:
   receiving a video file;
   segmenting the video file into a plurality of segments of video data;
   determining one or more feature values for individual segments of the plurality of segments;
   classifying the individual segments into respective classes using the model, the classes associated with respective encoding schemes;
   encoding the individual segments using the respective encoding schemes to generate a plurality of compressed segments; and
   assembling the plurality of compressed segments into a continuous data stream.

9. The method of claim 8, further comprising:
   encoding at least two of the plurality of segments using different encoding schemes.

10. The method of claim 8, further comprising:
segmenting the video file in the plurality of segments based at least in part on one or more encoder-determined compression characteristics of the video file.

11. The method of claim 1, further comprising:
receiving the video data from a third party provider; and
transmitting the encoded video data to the third party provider or a user device associated with the third party provider.

12. A system, comprising:
at least one computing device processor; and
a memory device including instructions that, when executed by the at least one computing device processor, cause the system to:
receive video data;
determine one or more feature values of the video data;
analyze the one or more feature values using a model trained to classify the video data into one of a plurality of classes associated with a plurality of respective encoding schemes, wherein the plurality of classes correspond to a plurality of clusters of sample video data formed during unsupervised training of the model the encoding scheme of a class determined based at least in part on feature values of sample video data in the cluster that corresponds to the class;
classify the video data into a class selected from the plurality of classes using the model, the class associated with an encoding scheme; and
encode the video data using the encoding scheme.

13. The system of claim 12, wherein the one or more feature values includes one or more video complexity values, including a degree of complexity within a frame of the video data and a degree of complexity between multiple frames of the video data.

14. The system of claim 12, wherein the instructions when executed further cause the system to:
obtain the plurality of training video data;
determine respective feature vectors for the plurality of training video data;
determine a plurality of clusters of features vectors;
define the plurality of classes based on the plurality of clusters; and
associate the plurality of classes with respective encoding.

15. The system of claim 14, wherein the instructions when executed further cause the system to:
determine respective model feature vectors for the plurality of classes, wherein the model includes at least the plurality of classes and respective model feature vectors;
generate a feature vector for the received video data;
compare the feature vector to the model feature vectors to determine the class of the received video data.

16. The system of claim 12, wherein the instructions when executed further cause the system to:
receive a video file;
segment the video file into a plurality of segments of video data;
determine one or more feature values for individual segments of the plurality of segments;
classify the individual segments into respective classes using the model, the classes associated with respective encoding schemes;
encode the individual segments using the respective encoding schemes to generate a plurality of compressed segments; and
combine the plurality of compressed segments into a continuous data stream.

17. A non-transitory computer-readable storage medium including instructions that, when executed by at least one processor of a computing system, cause the computing system to:
receive video data;
determine one or more feature values of the video data;
analyze the one or more feature values using a model trained to classify the video data into one of a plurality of classes associated with a plurality of respective encoding schemes, wherein the plurality of classes correspond to a plurality of clusters of sample video data formed during unsupervised training of the model the encoding scheme of a class determined based at least in part on feature values of sample video data in the cluster that corresponds to the class;
classify the video data into a class selected from the plurality of classes using the model, the class associated with an encoding scheme; and
encode the video data using the encoding scheme.

18. The non-transitory computer-readable storage medium of claim 17, wherein the one or more feature values includes one or more video complexity values, including a degree of complexity within a frame of the video data and a degree of complexity between multiple frames of the video data.

19. The non-transitory computer-readable storage medium of claim 17, wherein the instructions when executed further cause the system to:
obtain the plurality of training video data;
determine respective feature vectors for the plurality of training video data;
determine a plurality of clusters of features vectors;
define the plurality of classes based on the plurality of clusters; and
associate the plurality of classes with respective encoding.

20. The non-transitory computer-readable storage medium of claim 19, wherein the instructions when executed further cause the system to:
determine respective model feature vectors for the plurality of classes, wherein the model includes at least the plurality of classes and respective model feature vectors;
generate a feature vector for the received video data;
compare the feature vector to the model feature vectors to determine the class of the received video data.

* * * * *